US012607592B2

(12) United States Patent
Okai et al.

(10) Patent No.: US 12,607,592 B2
(45) Date of Patent: Apr. 21, 2026

(54) GAS SENSOR

(71) Applicant: NITERRA CO., LTD., Nagoya (JP)

(72) Inventors: Masana Okai, Nagoya (JP); Kensuke Mizutani, Nagoya (JP); Ryoji Aoki, Nagoya (JP); Yusuke Ando, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 157 days.

(21) Appl. No.: 18/516,234

(22) Filed: Nov. 21, 2023

(65) Prior Publication Data

US 2024/0175843 A1 May 30, 2024

(30) Foreign Application Priority Data

Nov. 25, 2022 (JP) ................................. 2022-188172

(51) Int. Cl.
*G01N 27/406* (2006.01)
*G01M 15/10* (2006.01)
*G01N 27/407* (2006.01)
(52) U.S. Cl.
CPC ...... *G01N 27/4078* (2013.01); *G01M 15/102* (2013.01); *G01N 27/4062* (2013.01)
(58) Field of Classification Search
CPC .... G01N 27/26; G01N 27/403; G01N 27/407; G01N 27/00; G01N 27/4078; G01N 27/4062; G01N 27/4077; G01M 15/02
See application file for complete search history.

(56) References Cited

U.S. PATENT DOCUMENTS 5,874,664 A * 2/1999 Watanabe .......... G01N 27/4078
73/23.32

FOREIGN PATENT DOCUMENTS

EP      1004876 A2 * 5/2000   ......... G01N 27/4077
FR      2849199 A1 * 6/2004   ......... G01N 27/4077
JP      3815823 B2    8/2006

OTHER PUBLICATIONS

English Machine Translation of FR2849199 (Year: 2003).*

* cited by examiner

*Primary Examiner* — Gurpreet Kaur
(74) *Attorney, Agent, or Firm* — Sughrue Mion, PLLC

(57)            ABSTRACT

A gas sensor (1) including: a sensor element (21); a tubular casing (81); a lead wire (71); and an elastic member (85) having a terminal passage hole (85h) through which the lead wire passes, the terminal passage hole having two or more annular projecting ridges (85R1-85R2) on an inner surface thereof, the elastic member being placed on a rear-end of the casing and sealing the opening (81e), wherein the casing is reduced in diameter by a crimping portion (81c) so that the projecting ridges contact with an outer surface of the lead wire in an airtight state, and when the elastic member is viewed in a state of being removed from the casing, an inner diameter d1 of a first projecting ridge which is the projecting ridge on a most-front-end side is smallest among inner diameters of all the projecting ridges.

4 Claims, 4 Drawing Sheets

GAS SENSOR

BACKGROUND OF THE INVENTION

1. Field of the Invention

The present invention relates to a gas sensor suitably used for detecting the gas concentration of a specific gas contained in combustion gas or exhaust gas of a combustor, an internal combustion engine, or the like, for example.

2. Description of the Related Art

As a gas sensor for detecting the oxygen concentration in exhaust gas of an automobile or the like, a sensor element is known having a detection electrode and a reference electrode provided at a surface of a tubular or plate-shaped solid electrolyte.

The sensor element is provided inside a tubular casing, and an output thereof is taken outside the casing through a lead wire connected to the element. In a rear-end opening of the casing through which the lead wire is led out, a seal member (elastic member) made of rubber is fitted in order to inhibit water or the like from entering the inside of the casing.

The lead wire passes through a passage hole of the seal member so as to extend outside the casing (Patent Document 1).

The seal member described in Patent Document 1 has a projecting portion on an inner surface of the passage hole so as to closely contact with an outer surface (insulation coating) of the lead wire in an airtight state.

Patent Document 1: Japanese Patent No. 3815823 (FIG. 3)

3. Problems to be Solved by the Invention

If the inner diameter of the projecting portion is excessively increased, the airtight state with the outer surface of the lead wire becomes insufficient. On the other hand, if the inner diameter of the projecting portion is excessively decreased, the airtight state with the outer surface of the lead wire is obtained but it becomes difficult to pass the lead wire through the passage hole.

SUMMARY OF THE INVENTION

Accordingly, an object of the present invention is to provide a gas sensor in which airtightness between an elastic member and a lead wire is improved and the lead wire can be easily passed through the elastic member.

The above object of the present invention has been achieved by providing (1) a gas sensor comprising: a sensor element extending in an axial-line direction and having a detection portion on a front-end side thereof; a tubular casing inside which the sensor element is placed, the casing having an opening at a rear end thereof; a lead wire electrically connected to the sensor element and extending outside the gas sensor through the opening; and an elastic member having a terminal passage hole through which the lead wire passes, the terminal passage hole having two or more annular projecting ridges on an inner surface thereof, the elastic member being placed on a rear-end inner side of the casing and sealing the opening, wherein the casing is reduced in diameter by a crimping portion on an outer side of the projecting ridges so that the projecting ridges contact with an outer surface of the lead wire in an airtight state, and when the elastic member is viewed in a state of being removed from the casing, an inner diameter of a first projecting ridge which is the projecting ridge on a most-front-end side is smallest among inner diameters of all the projecting ridges.

In general, the front-end side of the elastic member receives, from the outer casing, heat of a detection target gas such as exhaust gas contacting the sensor element, and therefore is likely to have a high temperature so as to expand, thus deteriorating the airtightness.

Accordingly, the inner diameter of the first projecting ridge on the most-front-end side where the temperature becomes high is set to be smaller than the inner diameter of the projecting ridge on the rear-end side where the temperature is lower, whereby the airtight state with the lead wire can be maintained even when the first projecting ridge is subjected to a high temperature. Meanwhile, the inner diameter of the projecting ridge on the rear-end side which is less likely to expand than the first projecting ridge is set to be greater, whereby the lead wire can be easily passed through the elastic member.

Thus, it is possible to achieve both airtightness between the elastic member and the lead wire and ease of passing the lead wire.

In a preferred embodiment (2) of the gas sensor (1) of the present invention, when the elastic member is viewed in a state of being removed from the casing, the inner diameters of all the projecting ridges are smaller than an outer diameter of the lead wire, and an inner diameter of the terminal passage hole except for all the projecting ridges is greater than the outer diameter of the lead wire.

When the inner diameters of the projecting ridges are smaller than the outer diameter of the lead wire, the airtightness between the elastic member and the lead wire is improved. In addition, when the inner diameter of the terminal passage hole is greater than the outer diameter of the lead wire, the lead wire can be more easily passed through the elastic member.

In another preferred embodiment (3) of the gas sensor (1) of the present invention, when the elastic member is viewed in a state of being removed from the casing, the inner diameter of the first projecting ridge is smaller than an outer diameter of the lead wire, and the inner diameter of the projecting ridge whose inner diameter is greatest among the projecting ridges is greater than the outer diameter of the lead wire.

When the inner diameter of the first projecting ridge is smaller than the outer diameter of the lead wire, the airtightness between the elastic member and the lead wire is improved. In addition, when the greatest inner diameter among the projecting ridges is greater than the outer diameter of the lead wire, the lead wire can be more easily passed through the elastic member.

That is, it is possible to better achieve both airtightness between the elastic member and the lead wire and ease of passing the lead wire.

In yet another preferred embodiment (4) of the gas sensor (1) of the present invention, the elastic member has three or more projecting ridges, and the inner diameters of two, of the projecting ridges, that are adjacent to each other in the axial-line direction are equal to each other, or the projecting ridge closer to a rear-end side has a greater inner diameter.

With this gas sensor, the inner diameters of the projecting ridges expand from the front end of the terminal passage hole toward the rear end thereof, so that the lead wire can be more easily passed through the elastic member.

Advantageous Effects of the Invention

According to the present invention, a gas sensor can be obtained in which airtightness between an elastic member and a lead wire is improved and the lead wire can be easily passed through the elastic member.

DESCRIPTION OF REFERENCE NUMERALS

Figure 1:
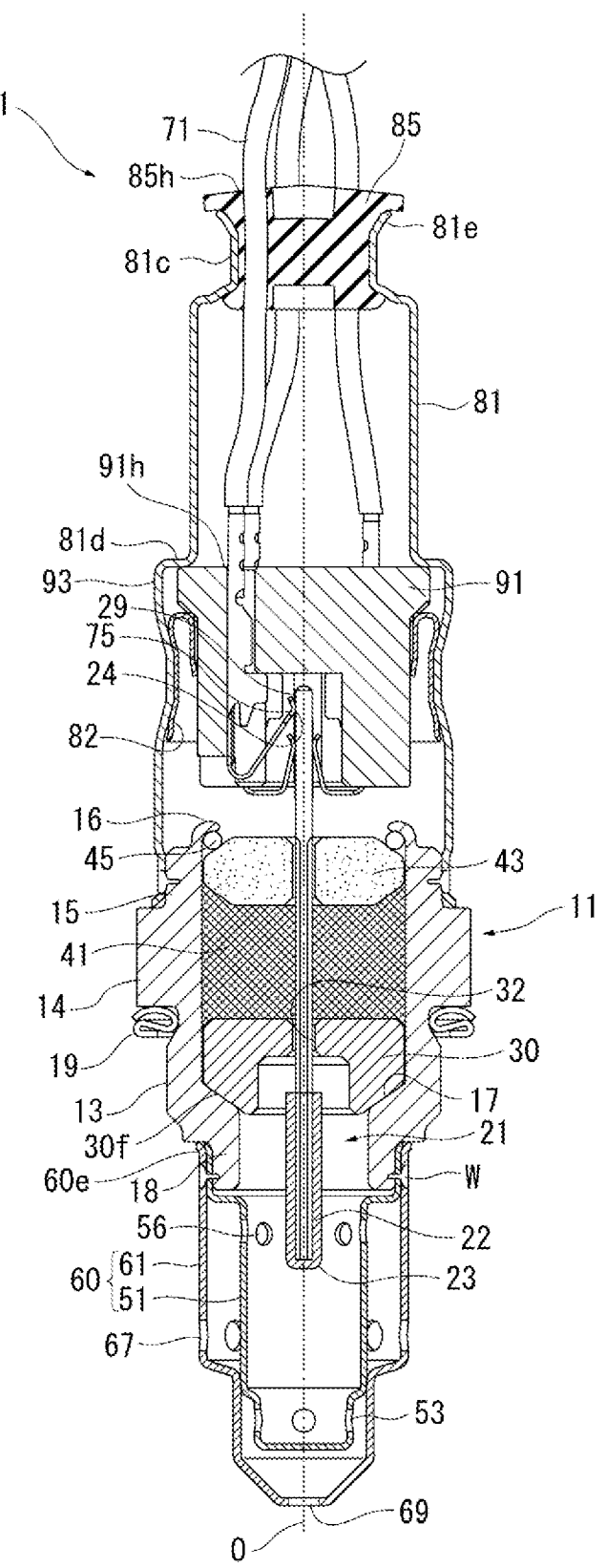
FIG. 1 is a section view of a gas sensor according to an embodiment of the present invention.

Reference numerals used to identify various features in the drawings include the following.
- 1 gas sensor
- 21 sensor element
- 22 detection portion
- 71 lead wire
- 81 casing (outer casing)
- 81*c* crimping portion
- 81*e* opening
- 85 elastic member(grommet)
- 85F elastic member(grommet) in a state of being removed from a casing
- 85*h* terminal passage hole
- 85R1-85R3 annular projecting ridge
- 85RF1-85RF3 annular projecting ridge in a state of being removed from a casing
- d1 inner diameter of the first projecting ridge
- d9 inner diameter of the terminal passage hole
- d10 outer diameter of the lead wire
- O axial-line

DETAILED DESCRIPTION OF THE PREFERRED EMBODIMENTS

An embodiment of the present invention will next be described with reference to the drawings. However, the present invention should not be construed as being limited thereto.

First, a gas sensor 1 according to the embodiment of the present invention will be described with reference to FIG. 1 to FIG. 4.

Figure 2:
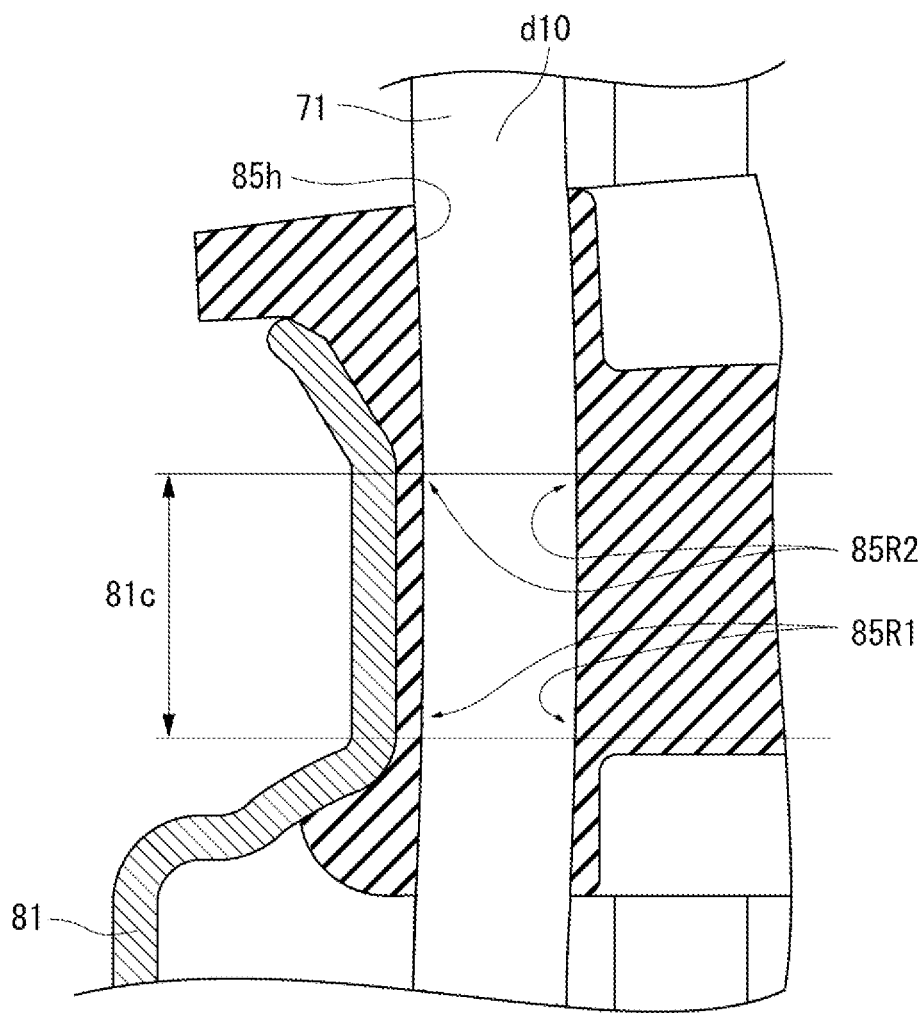
FIG. 2 is a partial enlarged view around the elastic member of FIG. 1.
Figure 3:
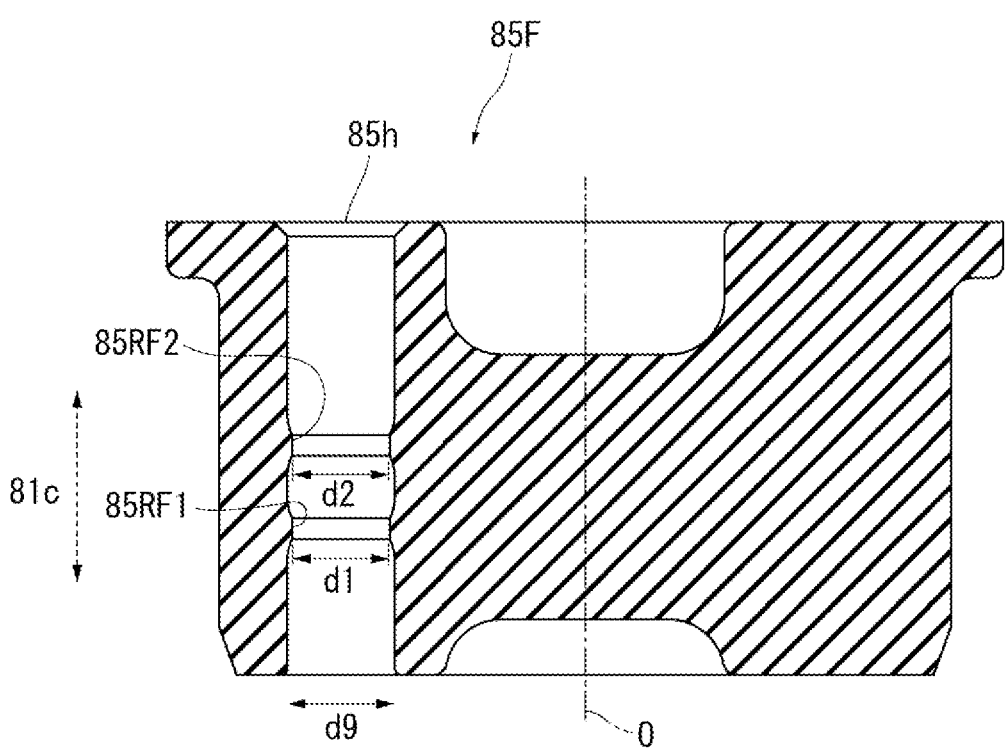
FIG. 3 is a sectional view showing the elastic member in a state of being removed from a casing.

FIG. 1 is a sectional view of a gas sensor (sensor) 1 according to the embodiment of the present invention. FIG. 2 is a partial enlarged view around an elastic member 85 in FIG. 1. FIG. 3 is a sectional view showing the elastic member 85F in a state of being removed from a casing 81.

In FIG. 1, a gas sensor (full-range air/fuel ratio gas sensor) 1 includes a sensor element 21, a holder (ceramic holder) 30 having a through hole 32 which penetrates in an axial-line-O direction and through which the sensor element 21 is inserted, a metal shell 11 surrounding the circumference in the radial direction of the ceramic holder 30, an outer casing (casing) 81, and a grommet (elastic member) made of rubber.

A front-end-side part of the sensor element 21 where a detection portion 22 is formed protrudes frontward of the ceramic holder 30. Thus, the sensor element 21 inserted through the through hole 32 is fixed while being maintained in an airtight state in the front-rear direction inside the metal shell 11 by compressing a seal powder (in this example, talc) 41 located on the rear-end-surface side (upper side in the drawing) of the ceramic holder 30 in the front-rear direction via a ring washer 45 and a sleeve 43 made of an insulating material.

A rear-end-29-side part including the rear end 29 of the sensor element 21 protrudes rearward of the sleeve 43 and the metal shell 11. Further, metal terminals 75 provided at front ends of lead wires 71 led outside the gas sensor through a grommet 85 are pressed in contact with electrode terminals 24 formed at the rear-end-29-side part, so as to be electrically connected thereto. The rear-end-29-side part of the sensor element 21 including the electrode terminals 24 is covered by the outer casing 81. Hereinafter, further details will be described.

The sensor element 21 has a band plate shape (plate shape) extending in the axial-line-O direction, and has, on the front-end side (lower side in the drawing) directed to a measurement target, the detection portion 22 which includes a detection electrode and the like (not shown) and which detects a specific gas component in a detection target gas. The sensor element 21 has a rectangular cross-section whose size is constant along the front-rear direction, and is formed in a thin long shape, using mainly ceramic (solid electrolyte, etc.).

The sensor element 21 is the same as a conventionally known one, in which a pair of detection electrodes forming the detection portion 22 are provided at a front-end-side part of the solid electrolyte (member), and continuously therefrom, the electrode terminals 24 to be connected with the lead wires 71 for taking out a detection output are formed and exposed at a rear-end-side part.

In this example, a heater (not shown) is provided inside a front-end-side part of a ceramic material laminated on the solid electrolyte (member), of the sensor element 21, and the electrode terminals 24 to be connected with the lead wires 71 for voltage application to the heater are formed and exposed at a rear-end-side part. Although not shown, the electrode terminals 24 are formed in a vertically long rectangular shape, and for example, three or two electrode pads are side-by-side arranged at large-width surfaces (both surfaces) of the band plate shape, at the rear-end-29-side part of the sensor element 21.

The detection portion 22 of the sensor element 21 is coated with a porous protection layer 23 made of alumina, spinel, or the like.

The metal shell 11 has a tubular shape whose front and rear sides are concentric and different in diameter. On the front-end side, the metal shell 11 has a cylindrical annular portion (hereinafter, also referred to as a cylindrical portion) 18 having a smaller diameter, and on an outer circumferential surface rearward thereof (upper side in the drawing), the metal shell 11 has a thread 13 having a larger diameter for fixation to an exhaust pipe of an engine. Further, rearward thereof, the metal shell 11 has a polygonal portion 14 used for screwing the sensor 1 by the thread 13. In addition, rearward of the polygonal portion 14, contiguously thereto, the metal shell 11 has a cylindrical portion 15 to which the protection tube (outer casing) 81 for covering the rear part of the gas sensor 1 is externally fitted and welded. Rearward thereof, the metal shell 11 has a thin crimping cylindrical portion 16 having a smaller outer diameter than the cylindrical portion 15. In FIG. 1, the crimping cylindrical portion 16 has been bent inward after being crimped. A gasket 19 for sealing at the time of screwing is attached at the lower surface of the polygonal portion 14.

The inner circumferential surface of the annular portion 18 of the metal shell 11 has a taper-shaped step portion 17 tapered inward in the radial direction from the rear-end side toward the front-end side.

On the inner side of the metal shell 11, the ceramic holder 30 made of insulating ceramic (e.g., alumina) and having a substantially short cylindrical shape is provided. The ceramic holder 30 has a frontward-facing surface 30f formed in a taper shape tapered toward the front end. An outer-circumferential-side part of the frontward-facing surface 30f is engaged with the step portion 17 and the ceramic holder 30 is pressed by the seal material 41 from the rear-end side, whereby the ceramic holder 30 is clearance-fitted and positioned inside the metal shell 11.

The through hole 32 is provided at the center of the ceramic holder 30, and is formed as a rectangular opening having almost the same dimension as the cross-section of the sensor element 21 so that the sensor element 21 is inserted with substantially no gap therebetween.

The sensor element 21 is inserted through the through hole 32 of the ceramic holder 30 so that the front end of the sensor element 21 protrudes frontward of the front ends of the ceramic holder 30 and the metal shell 11.

A front-end part of the sensor element 21 is covered by a protector 60 which has a tubular shape and allows a measurement target gas to be introduced/discharged. In the present embodiment, the protector 60 is formed as a double-layer protector in which a bottomed cylindrical inner protector 51 having vent holes 56 and discharge holes 53, and a bottomed cylindrical outer protector 61 having vent holes 67 and discharge holes 69, are arranged separately from each other.

The inner protector 51 and the outer protector 61 are welded with their rear end 60e overlapped on the outer surface of the annular portion 18, whereby a welded portion W is formed.

As shown in FIG. 1, the metal terminals 75 provided at the front ends of the lead wires 71 led outside the gas sensor through terminal passage hole 85h (four in the present example) of the grommet 85 are, by spring property thereof, pressed in contact with the electrode terminals 24 formed at the rear-end-29-side part of the sensor element 21, so as to be electrically connected thereto.

In the gas sensor 1 in this example, the metal terminals 75 including the pressed contact portions are retained in respectively opposed arrangement in storage portions 91h (four in the present example) provided in an insulating separator 91 placed in the outer casing 81. Movement of the separator 91 in the radial direction and the frontward direction is restricted by a metal retainer 82 crimped and fixed in the outer casing 81. The front-end part of the outer casing 81 is externally fitted and welded to the cylindrical portion 15 at the rear-end-side part of the metal shell 11, whereby the rear side of the gas sensor 1 is covered in an airtight state.

The lead wires 71 are led outside the gas sensor through the grommet 85 provided inside an opening 81e at the rear end of the outer casing 81, and a crimping portion 81c of the outer casing 81 located on the outer side of the grommet 85 is crimped to be reduced in diameter so that the grommet 85 is compressed, whereby the airtight state at this part is maintained.

The outer casing 81 has a step portion 81d which is formed at a position slightly shifted toward the rear end side from the center in the direction of the axial line O in such a manner that the outer casing 81 has a larger diameter on the forward end side of the step portion 81d. The inner surface of this step portion 81d supports the separator 91 while pressing forward the rear end of the separator 91. Meanwhile, the separator 91 has a flange 93 formed on the outer circumference thereof, and the flange 93 is supported on the holding member 82 fixed to the inner side of the outer casing 81, whereby the separator 91 is held in position in the direction of the axial line O by the step portion 81d and the holding member 82.

Next, with reference to FIG. 2 and FIG. 3, the grommet 85 which is a characteristic feature of the present invention will be described.

As shown in FIG. 2, two annular projecting ridges 85R1, 85R2 are arranged along the axial-line-O direction on the inner surface of the terminal passage hole 85h of the grommet 85.

The projecting ridges 85R1, 85R2 contact with the outer surface of the lead wire 71 in an airtight state, whereby the airtight state between the grommet 85 and the lead wire 71 is maintained. When the crimping portion 81c is crimped, the projecting ridges 85R1, 85R2 are crushed and the grommet 85 and the lead wire 71 closely contact each other also at parts other than the projecting ridges 85R1, 85R2, without gaps therebetween.

The projecting ridges 85R1, 85R2 are no longer visible because they are crushed as described above, and therefore in FIG. 2, the positions of the projecting ridges 85R1, 85R2 are shown by arrows.

The projecting ridges 85R1, 85R2 are arranged at positions overlapping the crimping portion 81c of the outer casing 81, along the axial-line-O direction.

When the crimping portion 81c is crimped so as to be reduced in diameter, the projecting ridges 85R1, 85R2 closely contact the outer surface of the lead wire 71.

As shown in FIG. 3, when the grommet 85F is viewed in a state of being removed from the outer casing 81, an inner diameter d1 of a first projecting ridge 85RF1 on the most-front-end side is smaller than an inner diameter d2 of another projecting ridge 85RF2.

In general, the front-end side of the grommet 85 receives, from the outer casing 81, heat of a detection target gas such as exhaust gas contacting the sensor element 21, and therefore is likely to have a high temperature so as to expand, thus deteriorating airtightness.

Accordingly, the inner diameter d1 of the first projecting ridge 85RF1 on the most-front-end side where the temperature becomes high is set to be smaller than the inner diameter d2 of the projecting ridge 85RF2 on the rear-end side where the temperature is lower, whereby the airtight state with the lead wire 71 can be maintained even when the first projecting ridge 85RF1 is subjected to a high temperature. Meanwhile, the inner diameter d2 of the projecting ridge 85RF2 on the rear-end side which is less likely to expand than the first projecting ridge 85RF1 is set to be greater, whereby the lead wire 71 can be easily passed through the grommet 85.

Thus, it is possible to achieve both airtightness between the grommet 85 and the lead wire 71 and ease of passing the lead wire 71.

The "state in which the grommet 85 is removed from the outer casing 81" refers to a state in which the outer casing 81 is cut and disassembled and the grommet 85 is removed so as to be in a no-load (non-compressed) state.

The grommet in a non-compressed state is denoted by "85F" so as to discriminate from the grommet 85 crimped in the gas sensor 1. Similarly, each projecting ridge in a non-compressed state is denoted by "85RF" so as to discriminate from each projecting ridge 85R crimped in the gas sensor 1.

The inner diameters d1, d2 may be smaller than an outer diameter d10 (see FIG. 2) of the lead wire, and an inner diameter d9 of the terminal passage hole 85h except for the projecting ridges 85RF1, 85RF2 may be greater than the outer diameter d10 of the lead wire.

When the inner diameters d1, d2 are smaller than the outer diameter d10 of the lead wire, the airtightness between the grommet 85 and the lead wire 71 is improved. In addition, when the inner diameter d9 of the terminal passage hole 85h is greater than the outer diameter d10 of the lead wire, the lead wire 71 can be more easily passed through the grommet 85.

Here, the outer diameter d10 is the outer diameter of the lead wire 71 on a side rearward of the grommet 85 (i.e., at a part not compressed by the grommet 85).

Notably, d9 is measured for the grommet 85 in the non-compressed state in FIG. 3.

The inner diameter d1 (the inner diameter of the first projecting ridge) may be smaller than the outer diameter d10, and the inner diameter d2 (the inner diameter of the projecting ridge whose inner diameter is greatest) may be greater than the outer diameter d10.

When the inner diameter d1 is smaller than the outer diameter d10, the airtightness between the grommet 85 and the lead wire 71 is improved. In addition, when the inner diameter d2 is greater than the outer diameter d10, the lead wire 71 can be more easily passed through the grommet 85.

That is, it is possible to better achieve both airtightness between the grommet 85 and the lead wire 71 and ease of passing the lead wire 71.

The present invention is not limited to the above embodiment and includes various modifications and equivalents encompassed in the idea and the scope of the present invention.

Figure 4:
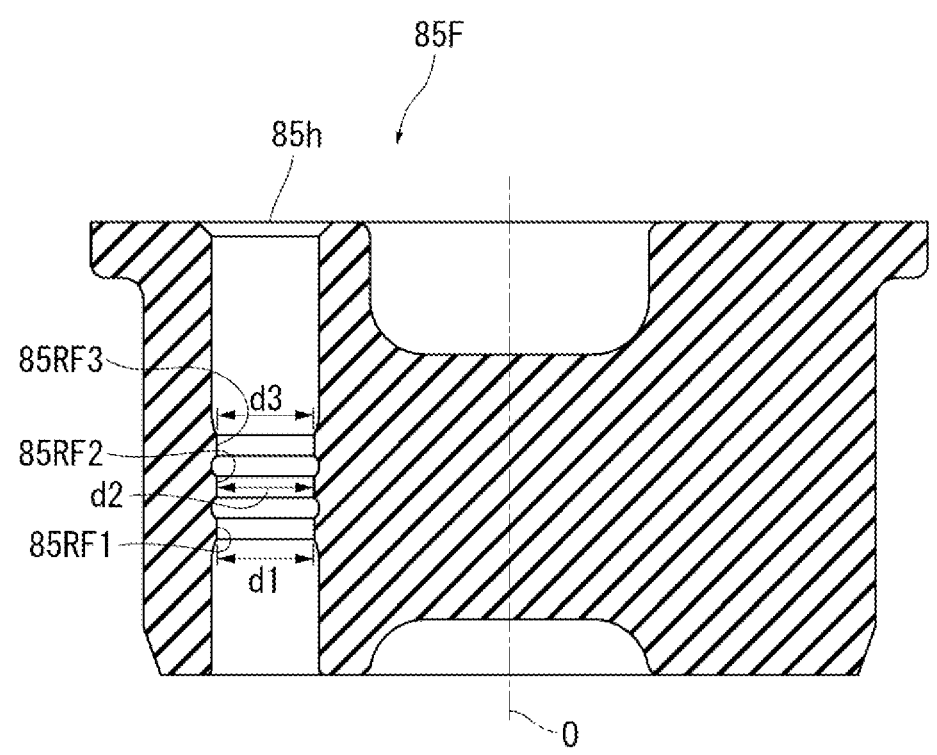
FIG. 4 is a sectional view showing the elastic member having three projecting ridges.

For example, as shown in FIG. 4, the grommet 85F may have three or more projecting ridges 85RF1 to 85RF3.

In this case, the projecting ridges are arranged in order of 85RF1, 85RF2, then 85RF3 from the front-end side, and where their inner diameters are denoted by d1, d2, d3, respectively, d1 is the smallest among d1, d2, d3.

The magnitude relationship of d1, d2, d3 may be (1) d1<d2=d3, (2) d1<d2<d3, or (3) d1<d2 >d3 (and d1<d3), for example.

Here, in a case where the inner diameters of two projecting ridges 85RF2, 85RF3 adjacent each other in the axial-line-O direction are equal to each other as in (1) or the inner diameters of the projecting ridges become greater toward the rear-end side as in (2), the inner diameters d1, d2, d3 of the projecting ridges 85RF1 to 85RF3 expand from the front end of the terminal passage hole 85h toward the rear end thereof, so that the lead wire 71 can be more easily passed through the grommet 85.

The disclosure has been described in detail with reference to the above embodiments. However, the disclosure should not be construed as being limited thereto. It should further be apparent to those skilled in the art that various changes in form and detail of the disclosure as shown and described above may be made. It is intended that such changes be included within the spirit and scope of the claims appended hereto.

This application is based on Japanese Patent Application No. 2022-188172 filed Nov. 25, 2022, the disclosure of which is incorporated herein by reference in its entirety.

What is claimed is:

1. A gas sensor comprising:

a sensor element extending in an axial-line direction and having a detection portion on a front-end side thereof;

a tubular casing inside which the sensor element is placed, the tubular casing having an opening at a rear end thereof;

a lead wire electrically connected to the sensor element and extending outside the gas sensor through the opening; and an elastic member having a terminal passage hole through which the lead wire passes, the terminal passage hole having two or more annular projecting ridges on an inner surface thereof, the elastic member being placed on a rear-end inner side of the tubular casing and sealing the opening, wherein the tubular casing is reduced in diameter by a crimping portion on an outer side of the projecting ridges so that the projecting ridges contact with an outer surface of the lead wire in an airtight state, and when the elastic member is viewed in a state of being removed from the tubular casing, an inner diameter of a first projecting ridge which is the projecting ridge on a most-front-end side is smallest among inner diameters of all the projecting ridges.

2. The gas sensor as claimed in claim 1, wherein when the elastic member is viewed in a state of being removed from the tubular casing, the inner diameters of all the projecting ridges are smaller than an outer diameter of the lead wire, and an inner diameter of the terminal passage hole except for all the projecting ridges is greater than the outer diameter of the lead wire.

3. The gas sensor as claimed in claim 1, wherein when the elastic member is viewed in a state of being removed from the tubular casing, the inner diameter of the first projecting ridge is smaller than an outer diameter of the lead wire, and the inner diameter of the projecting ridge whose inner diameter is greatest among the projecting ridges is greater than the outer diameter of the lead wire.

4. The gas sensor as claimed in claim 1, wherein the elastic member has three or more projecting ridges, and the inner diameters of two, of the projecting ridges, that are adjacent to each other in the axial-line direction are equal to each other, or the projecting ridge closer to a rear-end side has a greater inner diameter.

* * * * *